(12) United States Patent
Wartena

(10) Patent No.: US 9,896,209 B2
(45) Date of Patent: Feb. 20, 2018

(54) LOWER DECK MOBILE CREW REST WITH LOWERED FLOOR

(71) Applicant: Driessen Aerospace Group N.V., Alkmaar (NL)

(72) Inventor: Jochem Floris Wartena, Amsterdam (NL)

(73) Assignee: Driessen Aerospace Group N.V., Alkmaar (NL)

( * ) Notice: Subject to any disclaimer, the term of this patent is extended or adjusted under 35 U.S.C. 154(b) by 157 days.

(21) Appl. No.: 14/854,526

(22) Filed: Sep. 15, 2015

(65) Prior Publication Data

US 2016/0075432 A1 Mar. 17, 2016

Related U.S. Application Data

(60) Provisional application No. 62/050,370, filed on Sep. 15, 2014.

(51) Int. Cl.
*B64D 11/00* (2006.01)
*B64D 9/00* (2006.01)

(52) U.S. Cl.
CPC ............... *B64D 11/00* (2013.01); *B64D 9/00* (2013.01); *B64D 2011/0046* (2013.01); *B64D 2011/0076* (2013.01)

(58) Field of Classification Search
CPC .. B64D 11/00; B64D 9/00; B64D 2011/0076; B64D 2011/0046
See application file for complete search history.

(56) References Cited

U.S. PATENT DOCUMENTS

| | | | | |
|---|---|---|---|---|
| 4,071,210 A * | 1/1978 | Mutke | ...................... | B60N 2/34 |
| | | | | 105/314 |
| 5,752,673 A | 5/1998 | Schliwa et al. | | |
| 6,808,142 B2 * | 10/2004 | Oki | .......................... | B64C 1/20 |
| | | | | 244/118.1 |
| 8,011,617 B2 * | 9/2011 | Curry | ........................ | B64C 1/20 |
| | | | | 244/118.1 |
| 8,342,449 B2 * | 1/2013 | Schuld | ................... | B64D 11/00 |
| | | | | 244/118.1 |
| 8,888,043 B1 * | 11/2014 | Olliges | .................. | B64D 11/00 |
| | | | | 105/316 |
| 2011/0068225 A1 | 3/2011 | Curry et al. | | |

FOREIGN PATENT DOCUMENTS

WO 2007042276 4/2007

OTHER PUBLICATIONS

Europe Patent Application No. 15185372.8, Extended Search Report dated Feb. 9, 2016.

* cited by examiner

*Primary Examiner* — Valentina Xavier
(74) *Attorney, Agent, or Firm* — Kilpatrick Townsend & Stockton LLP; Dean W. Russell; Kristin M. Crall

(57) ABSTRACT

Embodiments of the present disclosure relate generally to lower deck mobile crew rests and improvements to the user experience and use of space therein. There is provided a lower floor with a second floor surface that can be extended and retracted with respect to the lower floor.

8 Claims, 5 Drawing Sheets

LOWER DECK MOBILE CREW REST WITH LOWERED FLOOR

CROSS REFERENCE TO RELATED APPLICATIONS

This application claims the benefit of U.S. Provisional Application Ser. No. 62/050,370, filed Sep. 15, 2014, titled "LDMCR with Lowered Floor," the entire contents of which are hereby incorporated by reference.

FIELD OF THE DISCLOSURE

Embodiments of the present disclosure relate generally to lower deck mobile crew rests and improvements to the user experience and use of space therein.

BACKGROUND

Crew rests may be used on some aircraft to offer crew members a resting place on long haul flights. Alternatively, passenger seats may be used, although this means that those seats are unavailable for paying customers and also means the crew does not have a comfortable place to sleep. When needed, lower deck mobile crew rests (LDMCRs) may be installed in an aircraft when possible (i.e., when the aircraft is large enough and there is no cargo in the cargo bay). When not needed, the LDMCR can be removed from the aircraft so the aircraft is able to accommodate more cargo.

A LDMCR is generally provided as a container-like space that can be loaded and unloaded onto the aircraft. It is generally desirable that the rest area include space, privacy, and comfort for the users. The rest area may include bunk space, stowage space, lavatory space, and other areas. Improvements to LDMCR containers are desirable in order to improve comfort as well as to improve the loading processes of the LDMCR.

BRIEF SUMMARY

Embodiments of the invention described herein thus provide systems and methods for improving lower deck mobile crew rests, the user experience, and the use of space therein. There is provided a lower floor with a second floor surface that can be extended and retracted with respect to the lower floor.

In one example, there is provided a lower deck mobile crew rest for an aircraft, comprising: an interior crew rest space, and a lower floor comprising a stationary floor portion and a lowerable floor portion, wherein the lowerable floor portion is configured to be moveable from a raised position in which the lower deck mobile crew rest is loadable onto the aircraft and a lowered position once the lower deck mobile crew rest is installed in a lower deck of an aircraft. The lowerable portion may comprise an accordion-like connection to the stationary floor portion of the lower floor. The lowerable floor portion may be configured to be retracted with respect to the interior crew rest space. The lowerable portion may extend below the stationary floor portion up to about 0.7 meters.

As shown in the figures, the lower deck mobile crew rest may have one or more bunk spaces in the interior portion, and the lowerable floor portion may move below the bunk or storage spaces, creating more leg space for users. There may be a lock feature provided in order to keep the lowerable floor portion in the retracted position when desired. In use, the lowerable floor portion may be vertically raised or lowered via an electrical system, a pneumatic system, a pulley system, manually via a mechanical system, or any combination thereof. The lowerable floor portion may be lowered into a space created in a cargo bay area technical floor.

In another example, there may be provided a lower deck mobile crew rest for an aircraft, comprising: an interior crew rest space, and a lower floor comprising a stationary floor portion and a lowerable floor portion, wherein the lowerable floor portion comprises a second floor surface configured to be retracted to be generally level with the stationary floor portion upon loading of the lower deck mobile crew rest and to be extended generally below the stationary floor portion once the lower deck mobile crew rest is installed in a lower deck of an aircraft.

In a further example, there may be provided a method for using a lower deck mobile crew rest in an aircraft having a cargo bay area with a technical floor having a moveable portion, comprising: providing an interior crew rest space, comprising a lower floor comprising a stationary floor portion and a lowerable floor portion, wherein the lowerable floor portion comprises a second floor surface configured to move with respect to the stationary floor portion; moving the moveable portion of the technical floor; and extending the lowerable floor portion into a space created by the movable portion.

DETAILED DESCRIPTION

Embodiments of the present invention provide a crew rest container 10 space configured to enhance the user experience. The crew rest container 10 generally has an upper ceiling 12 and a lower floor 14. Traditionally, the floors of crew rest spaces are formed as a traditional, flat floor panel. The present disclosure provides a lower floor 14 that can be lowered.

Figure 1:
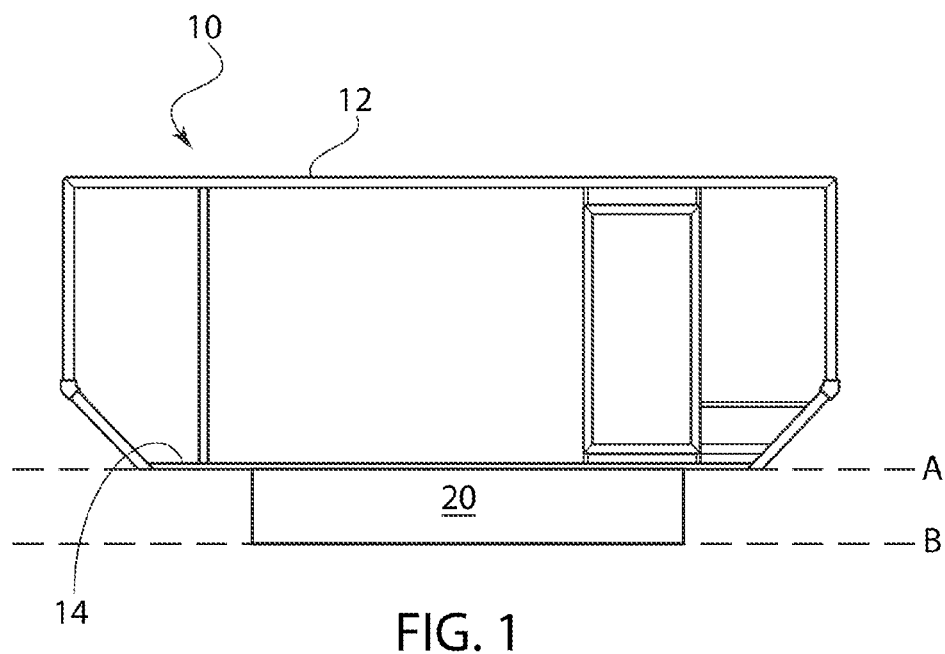
FIG. 1 shows a side plan view of a lower deck mobile crew rest having a lowerable floor portion in a lowered, extended position.
Figure 2:
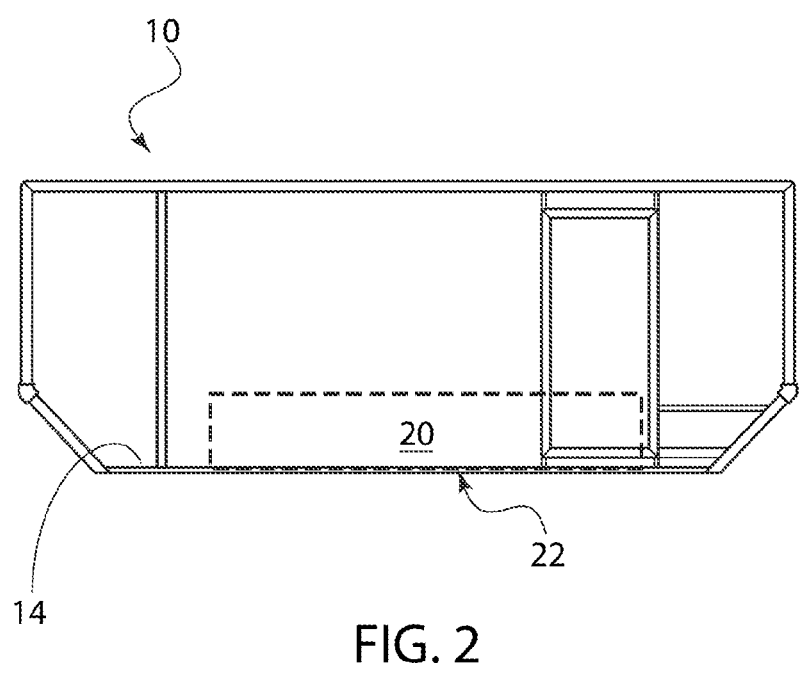
FIG. 2 shows a side plan view of the lower deck mobile crew rest of FIG. 1, with the lowerable floor portion in its retracted, raised position.
Figure 5A:
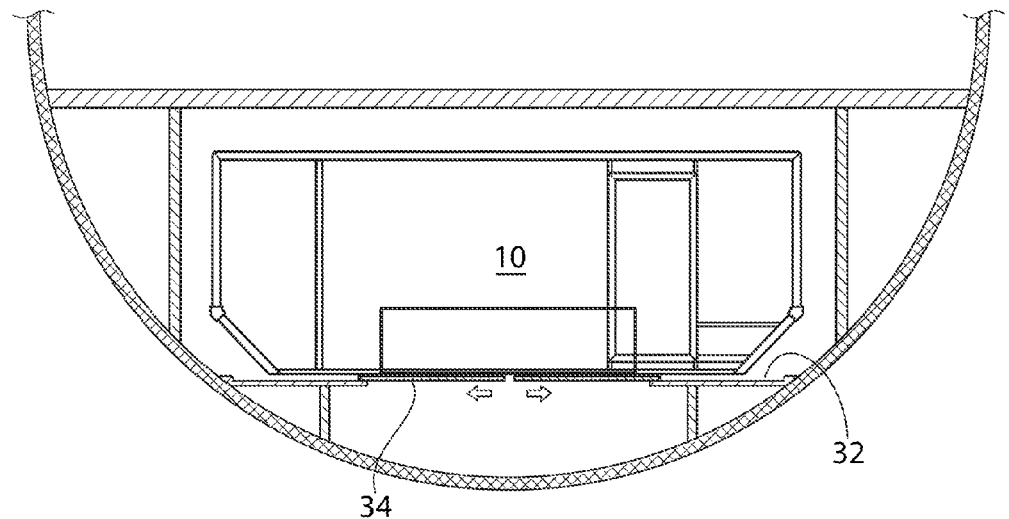
FIG. 5A shows a cargo area of an aircraft having a lower deck mobile crew rest installed, prior to extension of the lowerable floor portion.

Accordingly, the present disclosure provides a lower floor 14 with a second floor surface 20 that can be extended and refracted from the lower floor 14. In use, this provides a first stationary floor surface formed by the lower floor 14 at a first level "A" and a second floor surface 20 formed by the extendable and retractable second floor surface 20 at a second level "B". This is illustrated by FIG. 1. When the crew rest container 10 is to be loaded onto an aircraft, the second floor 20 is retracted, as is shown in FIG. 2. This provides a flat lower surface 22 for the container 10, which can ease the loading and installation process. Once the container 10 is positioned on-board the aircraft in the desired location, the second floor surface 20 may be extended, as is shown in FIGS. 1 and 5. This provides a portion of the floor that is lowered further, which may allow a user to stand upright inside the container 10.

Figure 3:
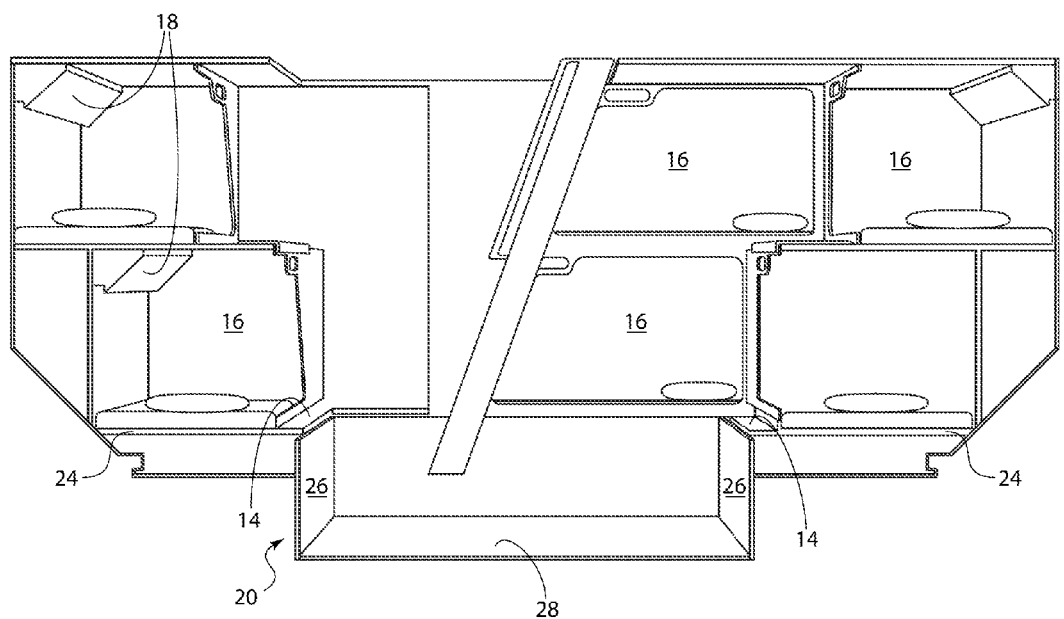
FIG. 3 shows a side perspective view of a lower deck mobile crew rest.

As illustrated by FIG. 3, a crew rest container 10 may generally have one or more bunks 16 and/or one or more storage spaces 18. Because some of the bunks 16 may be positioned close to the lower floor 14, access to these spaces can be difficult for users. Additionally, mobile crew rests are often provided as being about 1.6 meters in height due to aircraft space considerations. Such a height does not always allow a person to stand fully upright in the rest area. By providing a second, lowerable floor portion 20, a container occupant may be allowed to stand upright. The added space can also help accommodate a ladder for reaching upper bunks 16. In one example, the second lowerable floor portion 20 may add up to about 0.5 meters to the space. In another example, the second lowerable floor portion 20 may add between about 0.2 to about 0.7 meters to the space. Greater or lesser spaces may be provided, depending upon aircraft needs and space requirements available.

In one example, the lower floor 14 of the interior of the container 10 may have stationary edges 24. These stationary edges 24 may form bunk spaces 16, storage spaces 18, or provide space for any other use. These stationary edges 24 do not move when the second lowerable floor surface 20 is lowered. The area to be lowered is generally positioned interiorly from the stationary edges 24. The area to be lowered may be formed as having sidewall portions 26 and a floor panel 28. When the lowerable floor is retracted into the interior space of the container 10 (e.g., upon loading) as illustrated by FIG. 2, the sidewalls are raised, causing the floor panel 28 to be raised as well. This may cause the floor panel 28 to actually be positioned above the lower floor 14 or generally level with the lower floor 14.

Figure 4A:
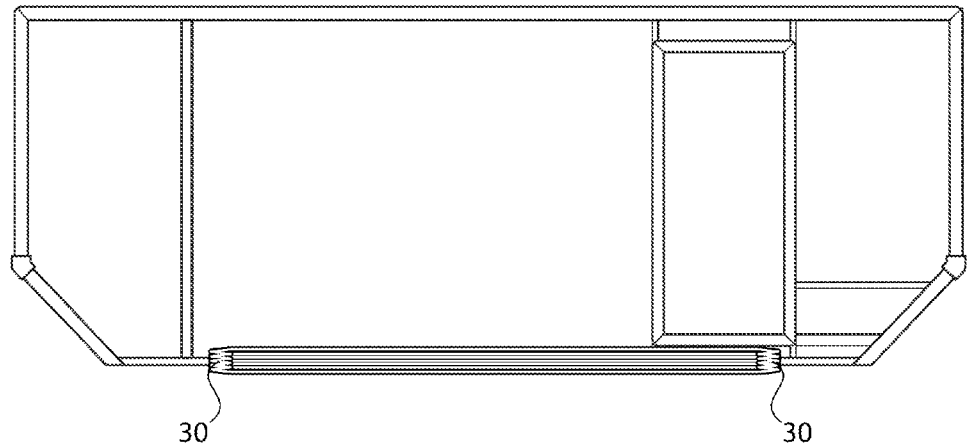
FIG. 4A shows a side plan view of a lower deck mobile crew rest having an accordion-like lowerable floor portion in the retracted position.
Figure 4B:
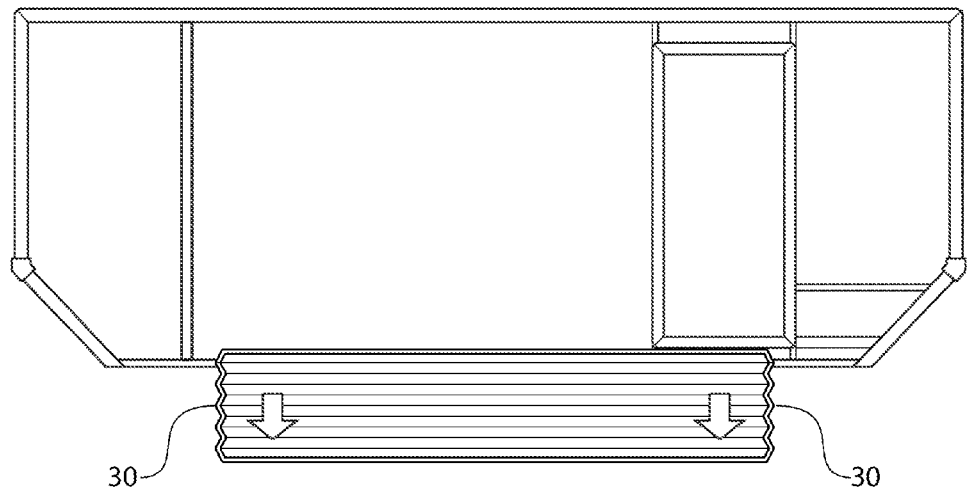
FIG. 4B shows a side plan view of a lower deck mobile crew rest having an accordion-like lowerable floor portion in the extended position.
Figure 6:
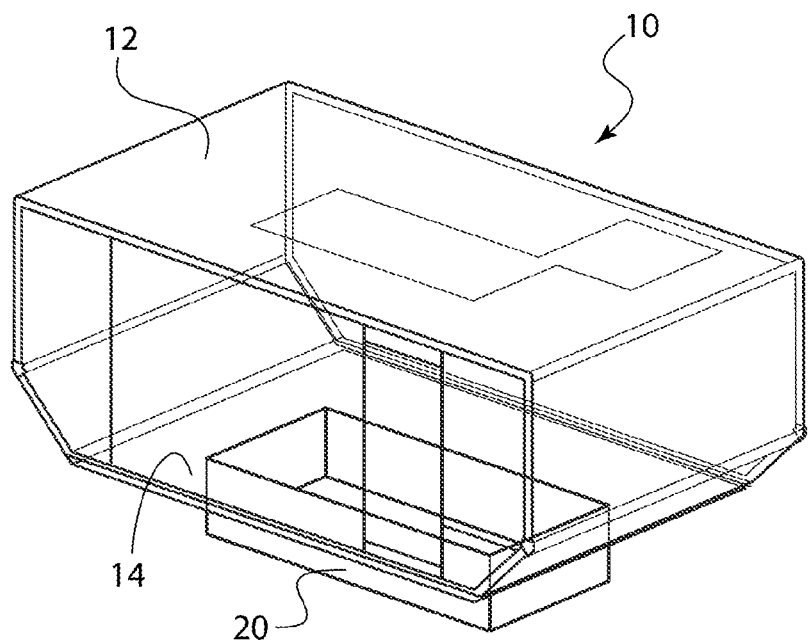
FIG. 6 shows a side perspective view of a lower deck mobile crew rest having a lowerable floor portion in a lowered, extended position.
Figure 7:
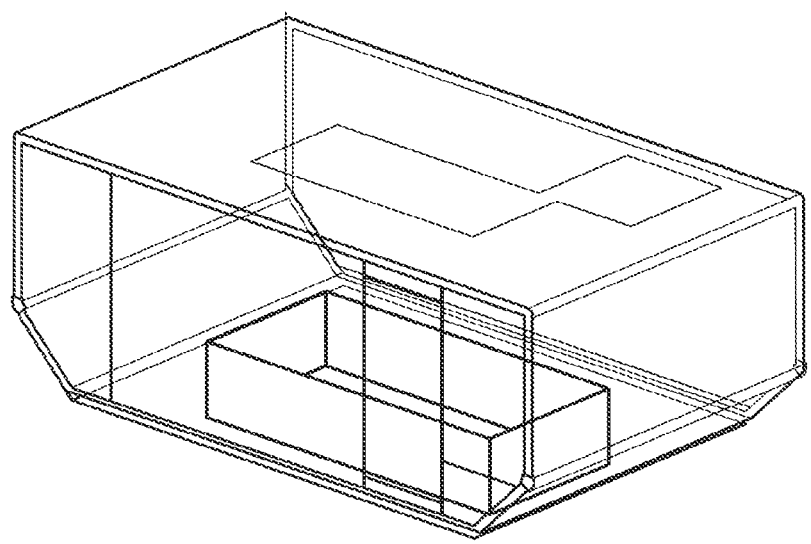
FIG. 7 shows a side perspective view of a lower deck mobile crew rest having a lowerable floor portion in a raised, retracted position.

In one example, when lowered, the second floor surface 20 may have an accordion-like cooperation with the stationary edges 24. In this example, the accordion-like sides of the lowerable portion 20 are provided as foldable flaps 30. One example of this is illustrated by FIG. 4. Foldable flaps 30 can fold upon one another upon retraction, as illustrated by FIG. 4A. They can be opened upon expansion of the lowerable portion 20, as illustrated by FIG. 4B. In another example, the walls may be provided as sidewalls that simply rise up and into the interior space of the container. This may render the lowerable portion generally level with the stationary lower floor 14. One example of this is illustrated by FIGS. 1 and 2, as well as FIGS. 6 and 7. In either embodiment, it is generally desirable that the flaps 30 and/or sidewalls 26 maintain an airtight connection with the container space 10. This can help prevent debris from hindering extension and retraction, as well as can help maintain the desired pressure within the container 10.

Figure 5B:
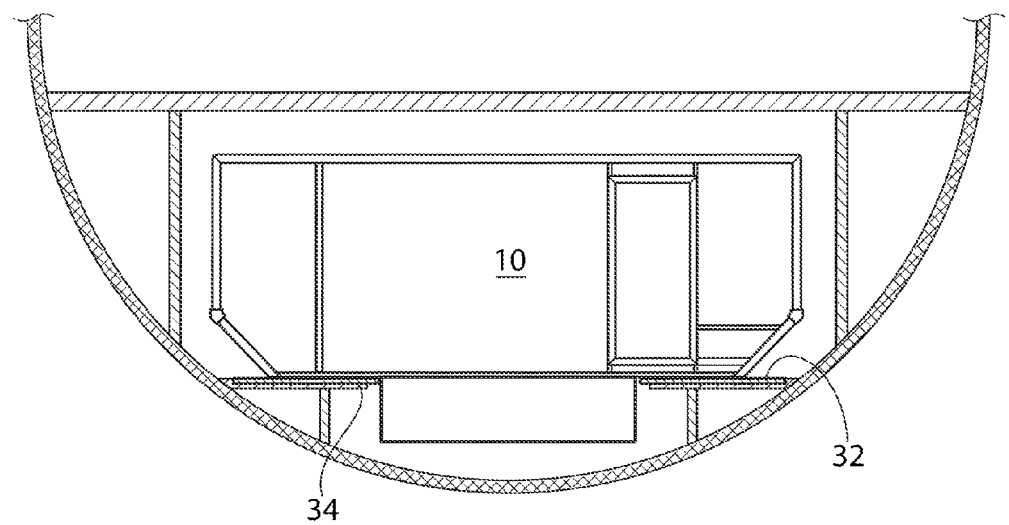
FIG. 5B shows a cargo area of an aircraft having a lower deck mobile crew rest installed, with a portion of the technical floor moved aside.

One example of a LDMCR 10 positioned on board an aircraft in the cargo holding area is illustrated by FIG. 5. In order to provide space for lowering of the second floor surface 20, a technical floor 32 of the aircraft cargo area may be designed to be movable. For example, the technical floor may have a movable portion 34 that is configured to slide open, as illustrated by FIG. 5B. The movable portion 34 of the technical floor 32 may be configured to move via mechanical pressure. The movable portion 34 of the technical floor 32 may be configured to open automatically via an electrical system. The movable portion 34 of the technical floor 32 may be configured to telescope open in at least one portion thereof. This could result in the moveable portion 34 being opened back against a stationary portion of the floor 32. For example, the technical floor 32 may have one or more portions 34 that slide or ride over the stationary portion of the floor 32 such that at least a portion of the moveable portion 34 and the stationary portion of the technical floor 32 overlap when opened. In any event, once the technical floor 32 has provided the appropriate space, the second floor surface 20 of the container 10 may be lowered such that it is generally below the stationary lower floor 14.

The second floor surface 20 may be vertically raised and/or lowered into the technical floor space created via an electrical system, a pneumatic system, a pulley system, manually via a mechanical system, any combination thereof, or using any other appropriate displacement method. For example, lowering of the second floor surface 20 of the container 10 may take place via user pressure from inside the container 10. A user may simply need to release a lock feature, and the lowerable portion 20 may release via gravity. The floor may be lowered upon activation of a press button or a lever on a user interface, sending a signal to a displacement system to cause movement/electronic floor lowering. Lowering of the second floor surface 20 of the container may take place automatically once the technical floor space is created, such that a technical floor movement system interfaces with a container floor lowering system. The systems may be mechanically linked such that movement of one system causes related movement of the other system. It should be understood that various lowering or displacement features may be used and are considered within the scope of this disclosure.

Regardless of the lowering system used, there may be provided a lock feature that maintains the lowerable second floor portion 20 in its locked position until released. The general goal is that when the container 10 is being loaded and/or unloaded, the lowerable floor 20 is retracted and does not interfere with the loading and/or unloading process.

Changes and modifications, additions and deletions may be made to the structures and methods recited above and shown in the drawings without departing from the scope or spirit of the disclosure or the following claims.

What is claimed is:

1. A lower deck mobile crew rest for an aircraft, comprising:
    a crew rest space comprising an interior space, the interior space comprising a lower floor comprising a stationary floor portion and a lowerable floor portion, wherein the lowerable floor portion comprises a second floor surface configured to be retracted into the interior space upon loading of the crew rest container and extended once the crew rest container is installed in a lower deck of an aircraft.

2. The lower deck mobile crew rest of claim 1, wherein the lowerable portion comprises an accordion-like connection to the stationary floor portion of the lower floor.

3. The lower deck mobile crew rest of claim 1, wherein the lowerable portion extends below the stationary floor portion up to about 0.7 meters.

4. The lower deck mobile crew rest of claim 1, further comprising one or more bunk or storage spaces in the crew rest container, and wherein the lowerable floor portion moves below the bunk or storage spaces, creating more leg space for users.

5. The lower deck mobile crew rest of claim 1, further comprising a lock feature.

6. The lower deck mobile crew rest of claim 1, wherein the lowerable floor portion is vertically raised or lowered via an electrical system, a pneumatic system, a pulley system, manually via a mechanical system, or any combination thereof.

7. The lower deck mobile crew rest of claim 1, wherein the lowerable floor portion is lowered into a space created in a cargo bay area technical floor.

8. A method for using a lower deck mobile crew rest in an aircraft having a cargo bay area with a technical floor having a moveable portion, comprising:
   providing a crew rest container comprising an interior space, the interior space comprising a lower floor comprising a stationary floor portion and a lowerable floor portion, wherein the lowerable floor portion comprises a second floor surface configured to be retracted into the interior space upon loading of the crew rest container and extended once the crew rest container is installed in a lower deck of an aircraft;
   moving the moveable portion of the technical floor; and
   extending the lowerable floor portion into a space created by the movable portion.

* * * * *